July 16, 1957     R. C. STROUP     2,799,052
SHAPED CARBON ARTICLE AND PROCESS OF PRODUCING THE SAME
Filed April 2, 1953
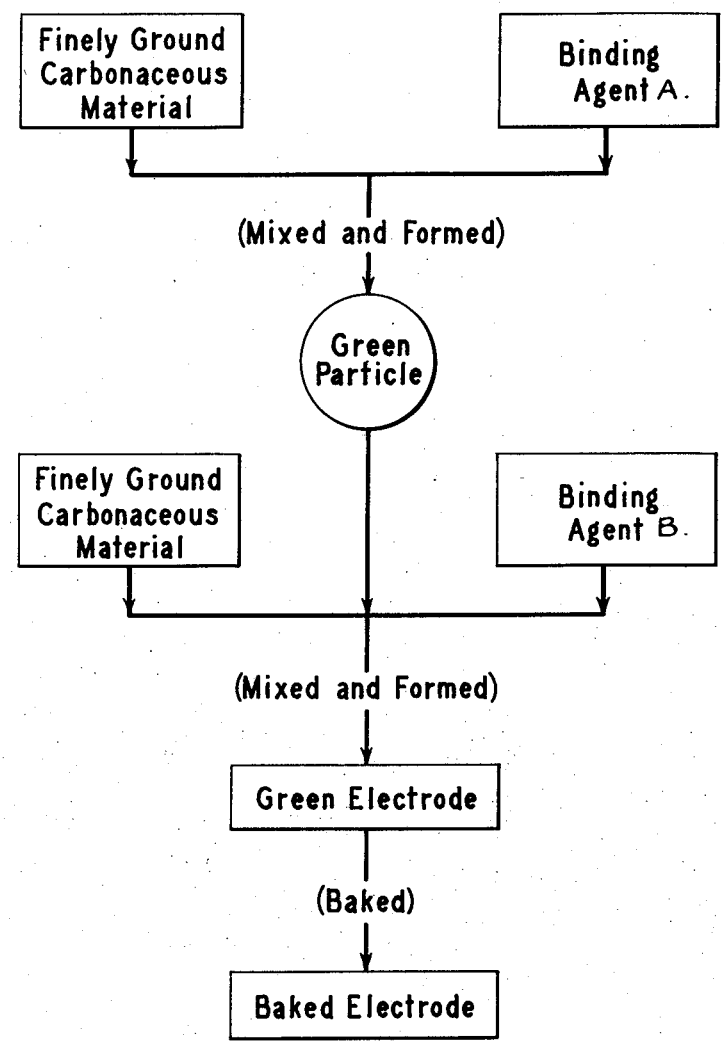
*INVENTOR.*
ROBERT C. STROUP
BY
*ATTORNEY*

2,799,052

SHAPED CARBON ARTICLE AND PROCESS OF PRODUCING THE SAME

Robert C. Stroup, Lewiston, N. Y., assignor to Union Carbide and Carbon Corporation, a corporation of New York Application April 2, 1953, Serial No. 346,518

6 Claims. (Cl. 18—54.7)

This invention relates to a new process for the manufacture of fabricated carbon and graphite products of improved qualities, and, more particularly, for the manufacture of electrothermic graphite electrodes. These types of electrodes are used as refractory conductors of electricity in electric furnaces. Their manufacture is ordinarily accomplished by an extrusion process wherein finely ground carbon or carbonaceous material, such as milled petroleum coke, is mixed with a binder, commonly some form of pitch, and then natural pellets of calcined petroleum coke are added, and the mass is extruded through a die. In order to effect mixing of the ground carbonaceous material with the binder, the mass is heated to a temperature of about 150° C. to 200° C. before extrusion.

The electrode thus formed is known in the art as a "green" electrode and must be further treated by baking to a high temperature. In the case of electrothermic electrodes, this heating is commonly continued to the point of graphitizing the electrode. This process lowers the electrical resistance of the electrode, renders its qualities and properties fairly stable over a wide temperature range, and, lastly, converts the low strength green electrode into one which is strong and capable of withstanding hard service.

It is the object of this invention to produce an electrode, particularly for large diameter electrothermic application, which possesses the high mechanical and structural strength characteristics of a fine-grained graphite article, but yet retains the thermal stability of a coarse-grained graphite article.

In determining the quality of final performance and the suitability of a large diameter electrode for electrothermic use, the degree of resistance to thermal shock and strain is of major importance. Thermal stresses are high in such electrodes because of the opportunities for the development of large temperature differentials within the electrode, due both to the relatively large size of these electrodes and to the vigorous service to which they are put on the large, modern, high-power electric furnaces. In order to obtain a high thermal stability under such conditions, it is desirable to prevent or reduce substantially the formation of so-called "flow lines" when the green carbon mass is extruded through the die. In a highly orientated electrode structure, the electrode properties are different in the transverse and longitudinal directions. The conventional method of reducing this orientation effect and accomplishing greater homogeneity of properties in the electrode is by including relatively large natural coke particles in the electrode mix.

While the addition of large natural coke particles to the green electrode mix does substantially solve the problem of flow lines by deorientating the material during extrusion, the presence of these particles in the final electrode has a deleterious effect in certain directions on the over-all electrode quality. In general, the coarser grained the electrode, that is, the greater the size and quantity of the natural coke particles added, the lower the strength and electrical conductivity of the electrode. This is due in part to the porous or weak nature of the large natural particles themselves, as well as to the physical changes that occur in this type of electrode during the baking and graphitizing. When the green electrode is baked, a certain amount of shrinkage occurs in the electrode, but the natural calcined coke particles present, being already baked and hard, do not shrink in proportion. Hence, areas of structural stress and strain tend to be set up around the individual particles.

I have discovered that the desired orientation effects can be achieved without the above-enumerated disadvantages which result from the use of calcined natural coke particles. By the practice of my invention, a finished electrode can be produced, relatively free of flow lines, and with an improved uniform fine-grained homogeneous structure throughout. This is accomplished by using, in place of natural calcined coke particles, synthetic particles mechanically formed from a green carbon mix similar to that used for the main body of the electrode. These synthetic particles effectively deorientate the green electrode mixture during the extrusion process, but during the baking process they ostensibly disappear and are adsorbed into, and actually become one with the main body of the electrode.

The synthetic particle used in the practice of my invention is produced by mixing finely ground carbon or carbonaceous material with a binder or pitch having a thermal stability or melting point substantially higher than that of the binder or pitch used in the mix of the main body of the electrode. The binder or pitch commonly used for making electrothermic electrodes has a melting point of about 90° C. to 100° C. Used in conjunction with such a mix, the binder or pitch used to make the synthetic particle should have a melting point of the order of 150° C., with 175° C. being preferred. If the pitch used for the main electrode mix has a melting point higher than the normal 90–100° C. range, then of course, the pitch used for the synthetic particle must have a proportionately higher melting point.

The pitch to be used in making the synthetic particle is melted sufficiently to mix into the fine-grained ground carbon, and this mix is then formed by molding, extruding, pelletizing, tableting, briquetting or a similar process, either to the size desired, or to some larger size which can then be broken up by grinding and screening or the like. The green synthetic particles thus produced vary upward in size from a minimum of about $\frac{1}{16}$ inch diameter. Their size increases in approximate proportion to the size of the electrode to be produced.

The final electrode mix is then made up with finely ground carbon or carbonaceous material and a binder pitch to which the synthetic particles are then added in the amount of from 30 to 60 percent of the weight of the carbonaceous material and binder pitch. This mixture is then heated just above the melting point of the pitch of electrode mix, but below the melting point of the pitch used in the green synthetic particle. Thus, this final mixing temperature is not high enough to melt the synthetic particles, which are made with the higher melting point pitch, and they remain solid and retain their shape identity, serving to effectively deorientate and prevent the appearance of flow lines in the extruded electrode.

When the extruded green electrodes are baked, however, the green synthetic particles melt, and being of the same basic composition as the rest of the electrode, are absorbed therein and disappear. The result is an electrode having a uniformly-grained homogeneous structure throughout, with none of the unfavorable characteristics caused by the presence of individual natural coke particles. The apparent density, specific resistance, and modulus of rupture of the baked electrodes made according to this invention are superior to those of large diameter electrothermic electrodes made by conventional methods, as is evidenced by the table which follows.

The drawing is a schematic representation of the invention. In the drawing at the top are shown the finely ground carbonaceous material and the binding agent of relatively high melting point, designated binding agent A in the drawing, which are mixed and formed into green particles as shown. These green particles are then mixed with more finely ground carbonaceous material and a binding agent of relatively low melting point, designated binding agent B in the drawing, and this mixture is then formed into a green electrode as shown. The green electrode is then baked to yield a baked electrode, as shown.

The table shows the results of tests performed on three different types of electrodes, each measuring four inches in diameter and fifteen inches in length. One of the electrodes was made according to this invention, the second was a conventional fine-grained electrode, and the third was a conventional coarse-grained electrode. The synthetic particles used in the electrode of the invention were formed from a mix of the following composition. The figures represent pounds of ingredients per hundred pounds of dry mix. The screening mesh was a standard Tyler screen.

SYNTHETIC PARTICLE MIX

| | Pounds |
|---|---|
| 55% through 200 mesh petroleum coke | 40 |
| Through 10 on 20 mesh petroleum coke | 40 |
| Through 20 on 35 mesh petroleum coke | 20 |
| 175° C. melting point pitch | 21.7 |

The pitch used in the main electrode mix to which the particles were added had a melting point of 100° C.

*Table of properties*

| | Synthetic Particle Type | | Conventional | | | |
|---|---|---|---|---|---|---|
| | | | Fine-Grained | | Coarse-Grained | |
| | Long. | Trans. | Long. | Trans. | Long. | Trans. |
| Apparent Density (Gms./cc.) | 1.55 | | 1.51 | | 1.45 | |
| Specific Resistance (ohms-cm. ×10⁻⁶) | 1,120 | 1,190 | 1,200 | 1,370 | 1,330 | 1,410 |
| Modulus of Rupture (lb./sq. in.) | 1,330 | 1,880 | 1,400 | 1,680 | 850 | 1,200 |
| Thermal Rating | Excellent | | Poor | | Good | |

While the invention has been described with particular reference to the making of electrodes, it is equally adapted to use in obtaining improved structure and overcoming the problem of flow lines as encountered in the manufacture of other types of large shaped carbon objects.

I claim:

1. A process for producing shaped carbon objects comprising mixing finely ground carbonaceous material with a binding agent having a relatively high melting point, forming therefrom, with suitable mechanical means, green synthetic particles of at least 1/16 inch approximate diameter, mixing said synthetic particles with finely ground carbonaceous material and a binding agent having a melting point substantially below the melting point of the binding agent used for the green synthetic particles, said particles comprising 30 to 60 percent by weight of the mixture, shaping the mixture in the desired manner, and then baking said shaped object.

2. A process for producing electrothermic electrodes comprising mixing finely ground carbonaceous material with a binding agent having a relatively high melting point, forming therefrom, with suitable mechanical means, green synthetic particles of at least 1/16 inch approximate diameter, mixing said synthetic particles with finely ground carbonaceous material and a binding agent having a melting point substantially below the melting point of the binding agent used for the green synthetic particles, said particles comprising 30 to 60 percent by weight of the mixture, extruding the mixture in the shape of an electrode and then baking said electrode.

3. A process for producing shaped carbon objects comprising mixing finely ground carbon with a binding agent having a melting point of from 150 to 175° C., forming therefrom, with suitable mechanical means, green synthetic particles of at least 1/16 inch approximate diameter, mixing said synthetic particles with finely ground carbon and a binding agent having a melting point of about 100° C., said particles comprising 30 to 60 percent by weight of the mixture, shaping the mixture in the desired manner, and then baking said shaped object.

4. A process for producing electrothermic electrodes comprising mixing finely ground carbon with a binding agent having a melting point of from 150 to 175° C., forming therefrom, with suitable mechanical means, green synthetic particles of at least 1/16 inch approximate diameter, mixing said synthetic particles with finely ground carbon and a binding agent having a melting point of about 100° C., said particles comprising 30 to 60 percent by weight of the mixture, extruding the mixture in the shape of an electrode, and then baking said electrode.

5. A green electrothermic electrode extruded from a mixture comprising finely ground carbonaceous material, a binding agent having a relatively low melting point, and from 30 to 60 percent by weight of green synthetic particles of at least 1/16 inch approximate diameter, formed by suitable mechanical means from finely ground carbonaceous material and a binding agent having a melting point substantially above the melting point of the binding agent used in the electrode mixture.

6. A green electrothermic electrode extruded from a mixture comprising finely ground carbon, a binding agent having a melting point of about 100° C., and from 30 to 60 percent by weight of green synthetic particles of at least 1/16 inch approximate diameter, formed by suitable mechanical means from finely ground carbon and a binding agent having a melting point of from 150 to 175° C.

References Cited in the file of this patent

UNITED STATES PATENTS

| 2,148,133 | Rueschler et al. | Feb. 21, 1939 |
| 2,365,055 | Cole | Dec. 12, 1944 |